US012445789B1

United States Patent
(12) United States Patent

Jiu

(10) Patent No.: US 12,445,789 B1
(45) Date of Patent: Oct. 14, 2025

(54) SONIC TRANSMISSION DEVICE

(71) Applicant: Evelyn Jiu, Martinez, CA (US)

(72) Inventor: Evelyn Jiu, Martinez, CA (US)

( * ) Notice: Subject to any disclaimer, the term of this patent is extended or adjusted under 35 U.S.C. 154(b) by 221 days.

(21) Appl. No.: 18/125,623

(22) Filed: Mar. 23, 2023

(51) Int. Cl.
*H04R 25/00* (2006.01)

(52) U.S. Cl.
CPC ......... *H04R 25/606* (2013.01); *H04R 25/554* (2013.01)

(58) Field of Classification Search
CPC ............................ H04R 25/606; H04R 25/554
See application file for complete search history.

(56) References Cited

U.S. PATENT DOCUMENTS 11,357,982 B2 * 6/2022 Friedling ............. H04R 25/554
11,864,886 B2 * 1/2024 Mortensen ........... A61B 5/6803

* cited by examiner

*Primary Examiner* — Brian Ensey
(74) *Attorney, Agent, or Firm* — Theodore J. Bielen, Jr.

(57) ABSTRACT

A sonic transmission device for delivering sound from a source to the ear of a human utilizing a transmitter for receiving the sound and converting the sound into a first radio frequency signal. A receiver acquires the first radio frequency signal and converts it into an electronic signal which is received by a cellular phone. The cellular phone converts the electronic signal into a second radio frequency signal which is acquired by an audio producing mechanism.

4 Claims, 2 Drawing Sheets

SONIC TRANSMISSION DEVICE

BACKGROUND OF THE INVENTION

The present application relates to a novel and useful sonic transmission device which is capable of delivering sound from a source and may serve as a hearing aid for persons hard of hearing.

Hearing loss in humans is a common problem caused by noise, aging, disease, and heredity. In the United States, approximately one in three people between the ages of 65 and 74 possess a hearing loss. In addition, nearly half of persons older than 75 exhibit difficulty in hearing. Needless to say, hearing loss is a medical problem that prevents persons having such hearing loss from conducting conversations with friends and family. Also, older people who cannot hear well tend to become depressed and withdraw from others because they feel frustrated or embarrassed by not being able to understand what is being said by others. As a result, older people are mistakenly thought to be confused, unresponsive, or uncooperative because their hearing is not adequate. Moreover, studies have shown that older adults with hearing loss have a greater risk of developing dementia. In addition, hearing loss causes cognitive abilities, such as memory and concentration, to decline faster in older adults.

Many persons having hearing loss are prescribed hearing aids to allow them to hear better. However, hearing aids suffer deficiencies in many ways. Often, hearing aids pick up background noise, which interferes with conversations. Also, hearings aids often are unable to amplify sounds sufficient to help a person with a hearing loss problem. Generally, hearings aids are relatively expensive to buy and maintain, and persons try not to wear them too often since repeated use increases the possibility of the hearing aid falling out of an ear and being lost.

In the past, many solutions have been proposed to provide listening assistance to persons with hearing losses. For example, United States Patent Application Publication US 2017/0257472 shows a method of establishing wireless communication between a pair of headsets using the communication link of a cell phone.

India Patent Application 3094/CHE/2011, China Publication 105827791A, United States Patent Application Publication US 2021/0211814, PCT Publication WO2022/051032, and U.S. Pat. No. 7,689,248 describe sound transmission combinations in which a sound is sent into the microphone of a cellphone and wirelessly transmitted to remote receivers, such as headsets.

U.S. Pat. No. 10,993,046 shows a smart phone based hearing aid where the microphone physically connects to a smartphone, which physically connects to a speaker, that may be in the form of a hearing aid or a headset.

A sonic transmission device, which may be used as a hearing aid, and which transmits sound wirelessly to a cellphone and wirelessly to a headset, would be a notable advance in the medical field.

SUMMARY OF THE INVENTION

The present application relates to a novel and useful sonic transmission device which may be employed as a hearing aid.

The device of the present application employs a transmitter which receives a sound from a source and converts the sound into a first radio frequency signal. The first radio frequency signal is sent to a receiver, which converts the same into a sonic signal, that is fed into a cellphone.

The cellphone is able to receive the electronic signal from the receiver and converts the same into a second radio frequency signal. An application software program is loaded into the cellphone to allow wireless transmission of the second radio frequency signal from the cellphone.

An audio producer is capable of receiving the second radio frequency signal from the cellphone and converting the same into an audio signal. The audio producer may take the form of a headset, which may be a bone conduction headset. Needless to say, the headset is configured to be mountable in the vicinity of the ear of the human and may include controls, such as volume and audio frequency.

It is believed that a novel and useful sonic transmission device, which may employed as a hearing aid, has been hereinabove described.

It is therefore an object of the present application to provide a sonic transmission device which may be employed as a hearing aid and is reliable and powerful.

Another object of the present application is to provide a sonic transmission device, which may be employed as a hearing aid, that is able to transfer sound from a speaker to a listener remotely located to the speaker.

Another object of the present application is to provide a sonic transmission device, which may be employed as a hearing aid, which is relatively inexpensive to produce and maintain.

Another object of the present application is to provide a sonic transmission device, which may be employed as a hearing aid, which employs a readily available cellphone or mobile phone as one of its components.

Yet another object of the present application is to provide a sonic transmission device, which may be employed as a hearing aid, that is capable of eliminating extraneous sounds which may interfere with the sound traveling from a speaker to a listener.

The application possesses other objects and advantages, especially as concerns particular characteristics and features thereof, which will become apparent as the specification continues.

For a better understanding of the application, reference is made to the following detailed description of the preferred embodiments, which should be referenced to the prior described drawings.

DETAILED DESCRIPTION OF THE PREFERRED EMBODIMENTS

Various aspects of the present application will evolve from the following detailed description of the preferred embodiments thereof, which should be referenced to the prior delineated drawings.

Figure 1:
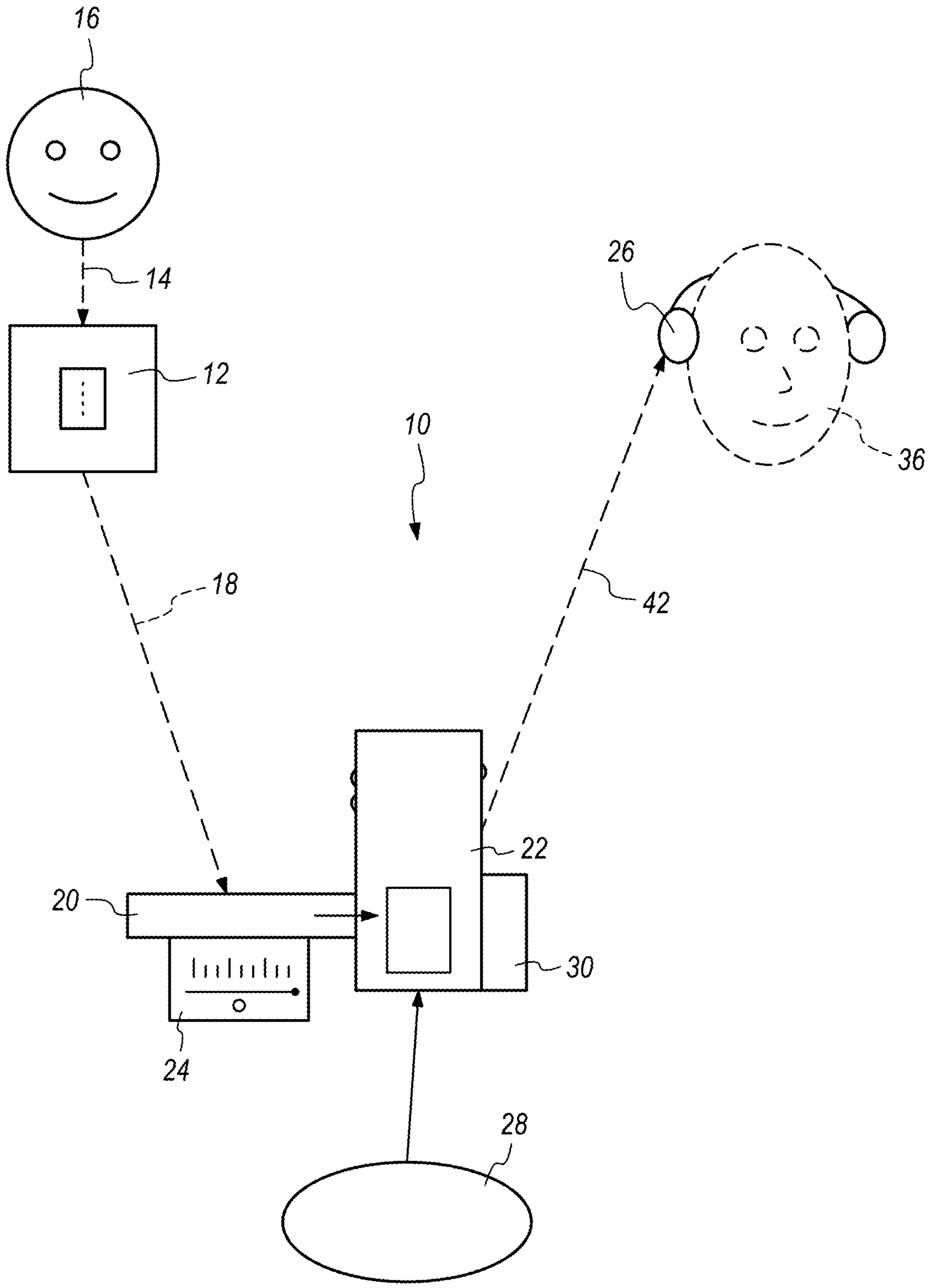
FIG. 1 is a block diagram indicating the overall operation of the device of the present application.

FIG. 1 represents the overall operation of device 10 of the present application for a sonic transmission device. Device 10 includes, as one of its elements, a transmitter or microphone 12 which is capable transferring an audio sound 14 from a speaker 16 into a first radio frequency signal 18. radio frequency signal is sent by transmitter 12 to a receiver 20 that is electronically connected to a cellphone 22. Transmitter 12 and receiver 20 may take the form of a Saramonic Blink500 Pro B4 Wireless Lavalier Microphone System, available from Saramonic International Co., Ltd. of Shenzhen, China. Receiver 20 includes a display 24 which indicates the status of receiver 20.

Cellphone 22 may externalize in a mobile phone, also known as a hand phone, pocket phone, or the like. Cellphone 22 may be available from multiple suppliers, such as Samsung Group of Seoul, South Korea.

Cellphone is intended to be used with a headset or headphone 26, such as one known as the Walker's Raptor Bluetooth. A Walker's Raptor application software 28 may be loaded into cellphone 22 to allow communication between cellphone 22 and headphone 26. Power charger or battery 30 maintains power to cellphone 22 during the process of transmission of sound 14 to headphone 26. Walker's Raptor Bluetooth headphone and application software 28 are available from Walker's of Irvine, Texas.

Figure 2:
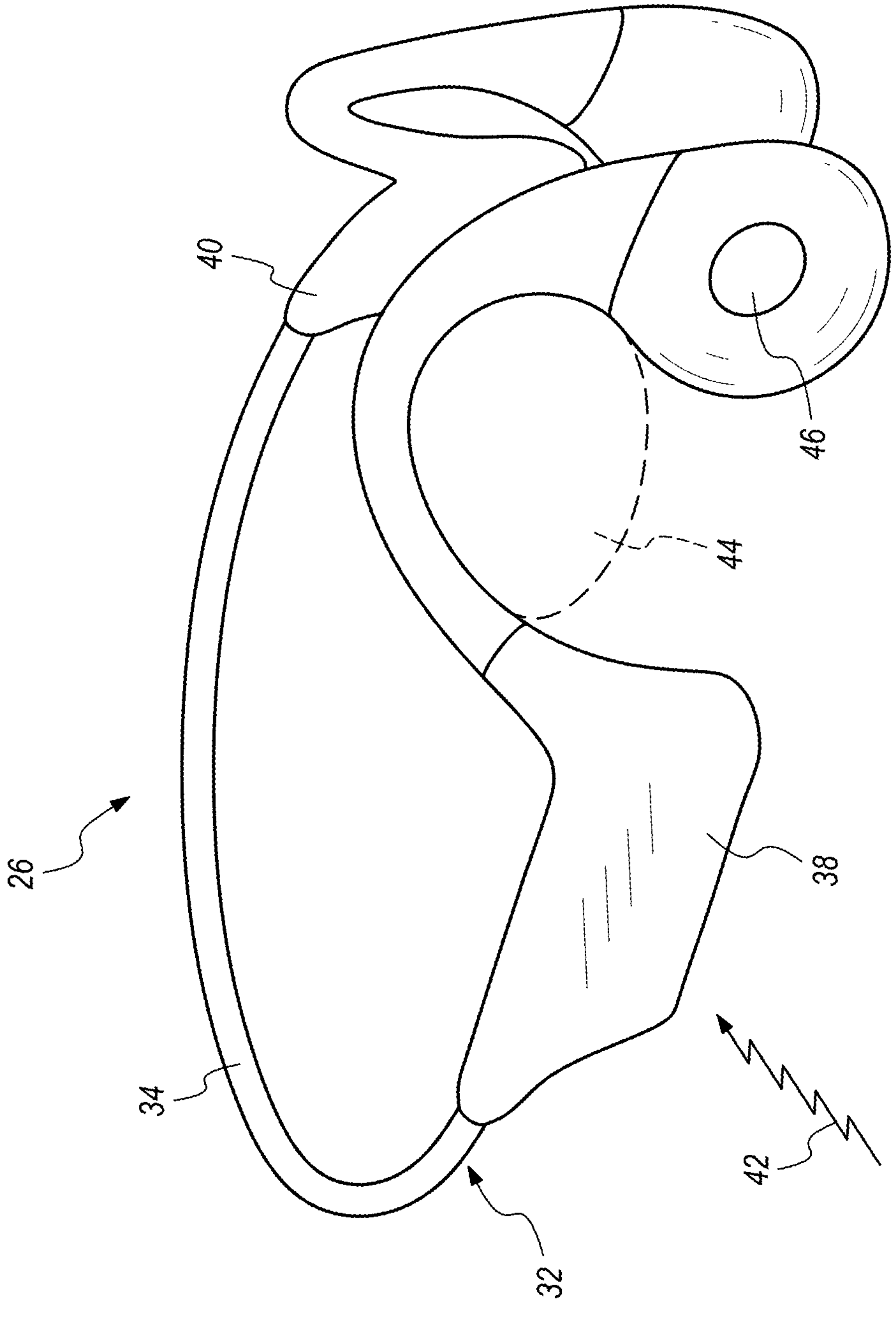
FIG. 2 is a respective view of a bone conduction audio headset.

With reference to FIG. 2, it may be observed that headset 26 takes the form of a bond conduction headset and includes a frame 32 having a band 34 that extends around the head 36 of the user, FIG. 1. Transducers 38 and 40 transmit sound waves to the bones in the head 36 of the user rather than through ear canals, as is the case in the prior art. Bluetooth signal 42 from cell phone 22 activates the transducers 38 and 40. Power button 46 initiates the operation of headphone 26.

In operation, speaker 16 generates a sound 14 which passes to transmitter or microphone 12. RF signal 18 from transmitter 12 passes to receiver 20 which is coupled with cellphone 22. Display 24 indicates the operation of receiver 20. Battery 30 powers cellphone 22 in a continuous manner. Application software 28 is loaded into the cellphone 22 such that a Bluetooth signal 42 passes to headphone 26. Headphone 26, via transducers 38 and 40, generates or produces a sound signal to the bones and the inner ear of the head 36 of a person. It should be noted that ear 44 and the ear canals of ear 44 are not used to receive the sound signals from headphone 26. It should also be noted that earplugs (not shown) may also be employed to protect the ears of head 36 to eliminate extraneous sounds to head 36 of a receiving person.

While in the foregoing embodiments of the application have been set forth in considerable detail for the purposes of making a complete disclosure of the invention, it may be apparent to those of skill in the art that numerous changes may be made in such details without departing from the spirit and principles of the invention.

What is claimed is:

1. A sonic transmission device for delivering a sound from a source to the ear of a human, comprising:

a transmitter for receiving the sound from the source and converting the sound into a first radio frequency signal;

a receiver, said receiver acquiring said first radio frequency signal and converting said first radio frequency signal into an electronic signal;

a cellular phone, said cellular phone receiving said electronic signal and converting said electronic signal into a second radio frequency signal;

an audio producer, said audio producer receiving said second radio frequency signal and converting said second radio frequency signal into an audio signal passed to the ear of a human, said audio producer comprising a bone conduction headset;

an earplug for protecting the ear of a human by eliminating extraneous sounds; and a support for said audio producer, said support being mountable in the vicinity of the ear of the human.

2. The device of claim 1 which additionally comprises an application software program (APP) loaded into said cellphone to permit wireless transmission of said second radio frequency signal from said cellphone to said audio producer.

3. The device of claim 1 which additionally comprises a power charger linked to said cellphone for maintaining power in said cellphone.

4. The device of claim 3 which additionally comprises an application software program (APP) loaded into said cellphone to permit wireless transmission of said second radio frequency signal from said cellphone to said audio producer.

* * * * *